United States Patent
Chen et al.

(10) Patent No.: US 9,551,919 B2
(45) Date of Patent: Jan. 24, 2017

(54) PROJECTION APPARATUS

(75) Inventors: Yu-Po Chen, Hsinchu (TW); S-Wei Chen, Hsinchu (TW)

(73) Assignee: Young Optics Inc., Hisnchu (TW)

( * ) Notice: Subject to any disclaimer, the term of this patent is extended or adjusted under 35 U.S.C. 154(b) by 990 days.

(21) Appl. No.: 13/244,634

(22) Filed: Sep. 25, 2011

(65) Prior Publication Data

US 2012/0249971 A1    Oct. 4, 2012

(30) Foreign Application Priority Data

Mar. 31, 2011    (TW) .............................. 100111299 A

(51) Int. Cl.
| | |
|---|---|
| G03B 21/00 | (2006.01) |
| G03B 21/20 | (2006.01) |
| G02F 1/29 | (2006.01) |
| G02F 1/295 | (2006.01) |

(Continued)

(52) U.S. Cl.
CPC ............. *G03B 21/2013* (2013.01); *G02F 1/29* (2013.01); *G02F 1/292* (2013.01); *G02F 1/293* (2013.01); *G02F 1/2955* (2013.01); *G03B 21/208* (2013.01); *G03B 21/2066* (2013.01); *G03B 21/28* (2013.01); *G03B 33/06* (2013.01)

(58) Field of Classification Search
CPC ............. G06F 1/29; G06F 1/292; G06F 1/293; G06F 1/295; G06F 1/2955; G03B 21/28; G03B 21/208; G03B 21/2066; G03B 21/2013; G03B 33/06
USPC .............................................. 353/37, 38, 98
See application file for complete search history.

(56) References Cited

U.S. PATENT DOCUMENTS

| | | | |
|---|---|---|---|
| 6,505,939 B1* | 1/2003 | Bierhuizen et al. ............ | 353/94 |
| 7,270,425 B2* | 9/2007 | Arai et al. ...................... | 353/87 |
| 2006/0221310 A1* | 10/2006 | Kim et al. ...................... | 353/99 |

(Continued)

FOREIGN PATENT DOCUMENTS

| | | |
|---|---|---|
| EP | 1793621 | 6/2007 |
| EP | 2000850 | 12/2008 |

(Continued)

OTHER PUBLICATIONS

"Office Action of Taiwan counterpart application" with English translation thereof, issued on Jun. 3, 2013, p. 1-p. 9.

*Primary Examiner* — Georgia Y Epps
*Assistant Examiner* — Kevin Wyatt
(74) *Attorney, Agent, or Firm* — Jianq Chyun IP Office

(57) ABSTRACT

A projection apparatus including a light source, a light valve, a light uniforming device, and a first curved-surface reflection device is provided. The light source provides an illumination beam. The light valve is disposed on a transmission path of the illumination beam for converting the illumination beam into an image beam. The light valve has an active surface that substantially has a rectangular contour. The light uniforming device is disposed on the transmission path of the illumination beam and between the light source and the light valve. The first curved-surface reflection device is disposed on the transmission path of the illumination beam and between the light source and the light valve for reflecting the illumination beam to the light valve. A curvature of the first curved-surface reflection device along a first direction is not equal to a curvature of the first curved-surface reflection device along a second direction.

24 Claims, 12 Drawing Sheets

(51) Int. Cl.
*G03B 21/28* (2006.01)
*G03B 33/06* (2006.01)

(56) References Cited

U.S. PATENT DOCUMENTS

| | | | |
|---|---|---|---|
| 2006/0238719 A1* | 10/2006 | Liu et al. | 353/37 |
| 2006/0238720 A1* | 10/2006 | Lee et al. | 353/38 |
| 2007/0103927 A1* | 5/2007 | Guo et al. | 362/555 |
| 2011/0090463 A1* | 4/2011 | Jhang et al. | 353/31 |
| 2012/0133898 A1* | 5/2012 | Chang | G03B 21/28 353/31 |

FOREIGN PATENT DOCUMENTS

| | | |
|---|---|---|
| TW | 494270 | 7/2002 |
| TW | M324785 | 1/2008 |
| TW | I300834 | 9/2008 |
| TW | 200909984 | 3/2009 |
| TW | 201109817 | 3/2011 |

* cited by examiner

PROJECTION APPARATUS

CROSS-REFERENCE TO RELATED APPLICATION

This application claims the priority benefit of Taiwan application serial no. 100111299, filed Mar. 31, 2011. The entirety of the above-mentioned patent application is hereby incorporated by reference herein and made a part of this specification.

BACKGROUND OF THE INVENTION

1. Field of the Invention

The invention generally relates to a projection apparatus, and more particularly, to a projection apparatus with improved light use efficiency.

2. Description of Related Art

Generally speaking, a conventional projection apparatus includes two lens arrays and a digital micro-mirror device (DMD). Each of the lens arrays includes a plurality of lens cells, and the lens cells in the two lens arrays are respectively corresponding to each other. A light beam can be led to the DMD by the lens cells in the lens arrays so that a light spot is shaped and uniformed. However, because the DMD in a conventional projection apparatus has a rectangular contour, the lens cells should also be a rectangle in order to produce a well-shaped and uniform light spot on the DMD.

In a conventional projection apparatus, the lens array closer to the light source has a specific valid range of the light collection angle. When a light beam from the light source radiates toward a lens cell in the lens array closer to the light source at an angle within the valid range of the light collection angle, the light beam is led to the corresponding lens cell in the other lens array and then to the DMD. However, when the light beam reaches a lens cell in the lens array closer to the light source at an angle outside the valid range of the light collection angle, the light beam is not led to the corresponding lens cell but a lens cell beside the corresponding lens in the other lens array. Thus, the travel direction of the light beam appears to deviate from the DMD and accordingly the light beam is not led to the DMD. As a result, light loss is caused. This phenomenon is referred to as crosstalk in which light loss is caused by brightness interference.

The valid range of the light collection angle of each lens cell is related to the width of the lens cell. Thus, when a light beam passes through a lens cell, the valid light collection angle in the direction parallel to the short side of the lens cell is smaller than that in the direction parallel to the long side of the lens cell. In this way, when the light beam enters the lens cell at an angle greater than the valid light collection angle of the lens cells, than the travel direction of the light beam deviates from the DMD and accordingly light loss is caused. For example, in order to display a widescreen image in the 16:9 aspect ratio in a conventional projection apparatus, a DMD having an aspect ratio of 16:9 should be adopted, and in order to achieve a shaped and uniform light spot, the aspect ratio of the lens cells should also be 16:9. However, this will make the short side of each lens cell to be shorter and the valid light collection angle thereof in the direction parallel to the short side to be smaller and cause more light loss.

An illumination system capable of shaping an illumination beam is provided in Taiwan Patent No. 1300834. The illumination system includes a point light source array, a biconic lens, and a collimator lens, wherein the collimator lens is disposed between the point light source array and the biconic lens.

SUMMARY OF THE INVENTION

Accordingly, the invention provides a projection apparatus in which an illumination beam is shaped by a curved-surface reflection device so that the light use efficiency of the projection apparatus is improved.

Other objectives, features and advantages of the invention will be further understood from the further technological features disclosed by the embodiments of the invention wherein there are shown and described preferred embodiments of this invention, simply by way of illustration of modes best suited to carry out the invention.

To achieve one of, a part of or all of the above-mentioned advantages, or to achieve other advantages, an embodiment of the invention provides a projection apparatus including a light source, a light valve, a light uniforming device, and a first curved-surface reflection device. The light source is configured to provide an illumination beam. The light valve is disposed on a transmission path of the illumination beam and configured to convert the illumination beam into an image beam. The light valve has an active surface, wherein the active surface substantially has a rectangular contour. The light uniforming device is disposed on the transmission path of the illumination beam and between the light source and the light valve. The first curved-surface reflection device is disposed on the transmission path of the illumination beam and between the light source and the light valve. The first curved-surface reflection device is configured to reflect the illumination beam to the light valve. A curvature of the first curved-surface reflection device along a first direction is not equal to a curvature of the first curved-surface reflection device along a second direction.

According to an embodiment of the invention, the first direction is substantially perpendicular to the second direction.

According to an embodiment of the invention, the light uniforming device includes at least one lens array.

According to an embodiment of the invention, the lens array has a plurality of rectangular lenses arranged as an array, and a ratio of the length of a short side of each rectangular lens to the length of a long side of each rectangular lens is greater than a ratio of the length of a short side of the active surface of the light valve to the length of a long side of the active surface of the light valve.

According to an embodiment of the invention, the ratio of the length of the short side of each rectangular lens to the length of the long side of each rectangular lens is substantially equal to 1.

According to an embodiment of the invention, the lens array has a plurality of rectangular lenses arranged as an array, the light source includes a rectangular light emitting diode (LED) chip, and a ratio of the length of a short side of each rectangular lens to the length of a long side of each rectangular lens is substantially equal to a ratio of the length of a short side of the rectangular LED chip to the length of a long side of the rectangular LED chip.

According to an embodiment of the invention, the ratio of the length of the short side of the rectangular LED chip to the length of the long side of the rectangular LED chip is substantially equal to 1.

According to an embodiment of the invention, the first curved-surface reflection device is between the light uniforming device and the light valve.

According to an embodiment of the invention, the projection apparatus further includes a second curved-surface reflection device between the light uniforming device and the first curved-surface reflection device, wherein a curvature of the second curved-surface reflection device along a third direction is not equal to a curvature of the second curved-surface reflection device along a fourth direction, and the third direction is substantially perpendicular to the fourth direction.

According to an embodiment of the invention, the projection apparatus further includes a reflection device between the first curved-surface reflection device and the light valve, wherein the reflection device reflects the illumination beam reflected by the first curved-surface reflection device to the light valve.

According to an embodiment of the invention, the projection apparatus further includes a lens module disposed on the transmission path of the illumination beam and between the light source and the light valve, wherein a diopter of the lens module along a fifth direction is not equal to a diopter of the lens module along a sixth direction.

According to an embodiment of the invention, the lens module includes a lens, a curvature of at least one surface of the lens along the fifth direction is not equal to a curvature of the surface of the lens along the sixth direction, the illumination beam passes through the surface, and the fifth direction is substantially perpendicular to the sixth direction.

According to an embodiment of the invention, the lens module is between the light source and the light uniforming device.

According to an embodiment of the invention, the lens module is between the light uniforming device and the first curved-surface reflection device.

According to an embodiment of the invention, the lens module is between the first curved-surface reflection device and the light valve.

According to an embodiment of the invention, the projection apparatus further includes a projection lens disposed on a transmission path of the image beam.

According to an embodiment of the invention, the projection apparatus further includes a total internal reflection (TIR) prism disposed on the transmission path of the illumination beam and between the light source and the light valve, wherein the TIR prism is disposed on the transmission path of the image beam and between the light valve and the projection lens.

According to an embodiment of the invention, the first curved-surface reflection device is between the light uniforming device and the TIR prism.

According to an embodiment of the invention, the first curved-surface reflection device is between the light source and the light uniforming device.

According to an embodiment of the invention, the projection apparatus further includes a field lens disposed on the transmission path of the illumination beam and between the light uniforming device and the light valve, wherein the field lens is disposed on the transmission path of the image beam and between the light valve and the projection lens.

According to an embodiment of the invention, the light source is configured to emit a first color beam, a second color beam, and a third color beam.

According to an embodiment of the invention, the light source further includes a light combination device disposed on transmission paths of the first color beam, the second color beam, and the third color beam for combining the transmission paths of the first color beam, the second color beam, and the third color beam.

According to an embodiment of the invention, the light uniforming device is a light integration rod.

According to an embodiment of the invention, the light source includes a LED or a high pressure mercury lamp.

As described above, an embodiment of the invention offers at least one of following advantages or functions. In a projection apparatus provided by an embodiment of the invention, the light spot formed by an illumination beam is shaped by a curved-surface reflection device into a rectangular shape corresponding to the shape of an active surface of a light valve, and the shape of a light uniforming device is corresponding to the shape of the light spot produced by the light source, so that the valid range of the light collection angle is broadened and the illumination beam is prevented from deviating from the DMD. Thereby, the quantity of the illumination beam reaching the light valve is increased and accordingly the light use efficiency of the projection apparatus is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1A:
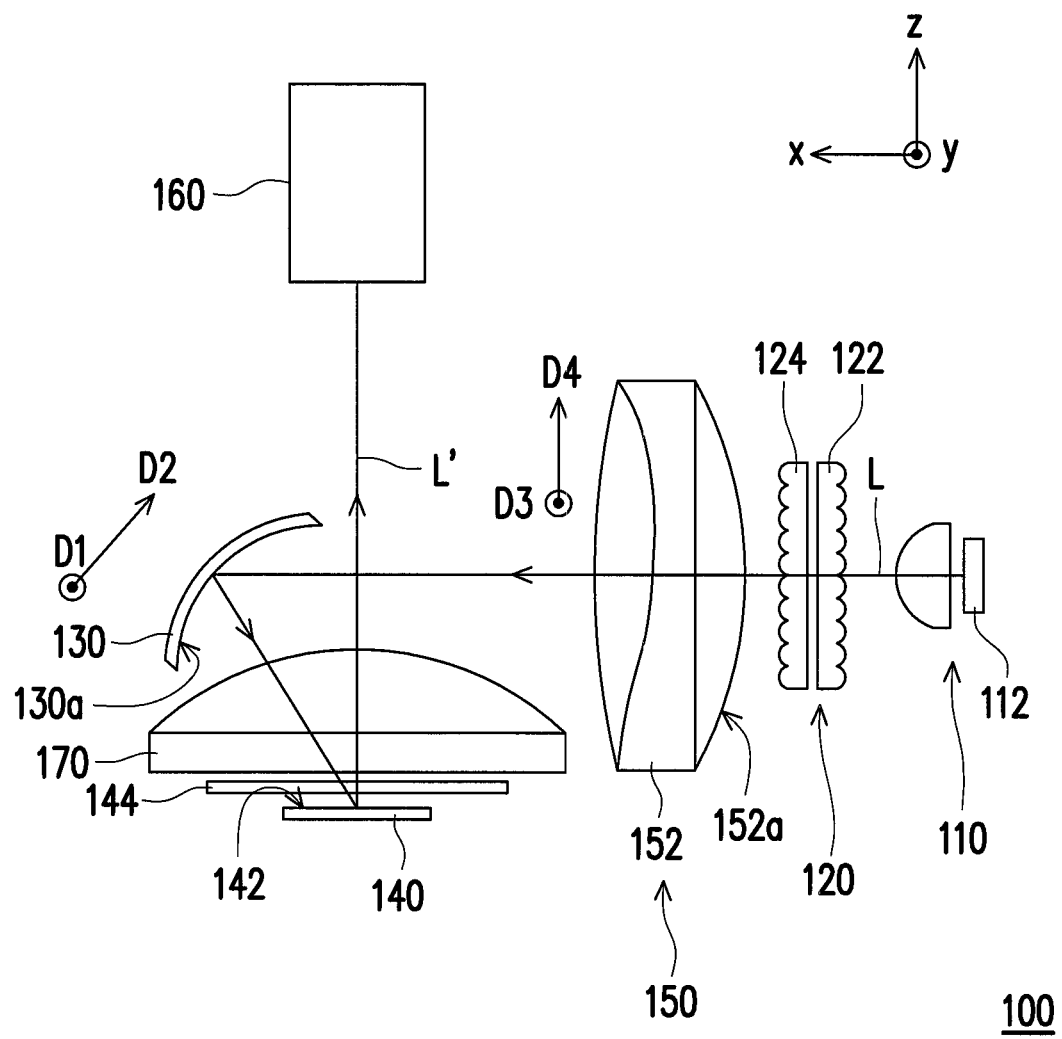
FIG. 1A is a top view of a projection apparatus according to a first embodiment of the invention.

FIG. 1A is a top view of a projection apparatus according to the first embodiment of the invention. Referring to FIG. 1A, the projection apparatus 100 in the embodiment includes a light source 110, a light uniforming device 120, a first curved-surface reflection device 130, and a light valve 140.

The light source 110 in the embodiment is configured to provide an illumination beam L. In the embodiment, the light source 110 may include a rectangular light emitting diode (LED) chip 112. However, the invention is not limited thereto, and in other embodiments, the light source 110 may also be a LED chip array or a high pressure mercury lamp.

Figure 1B:
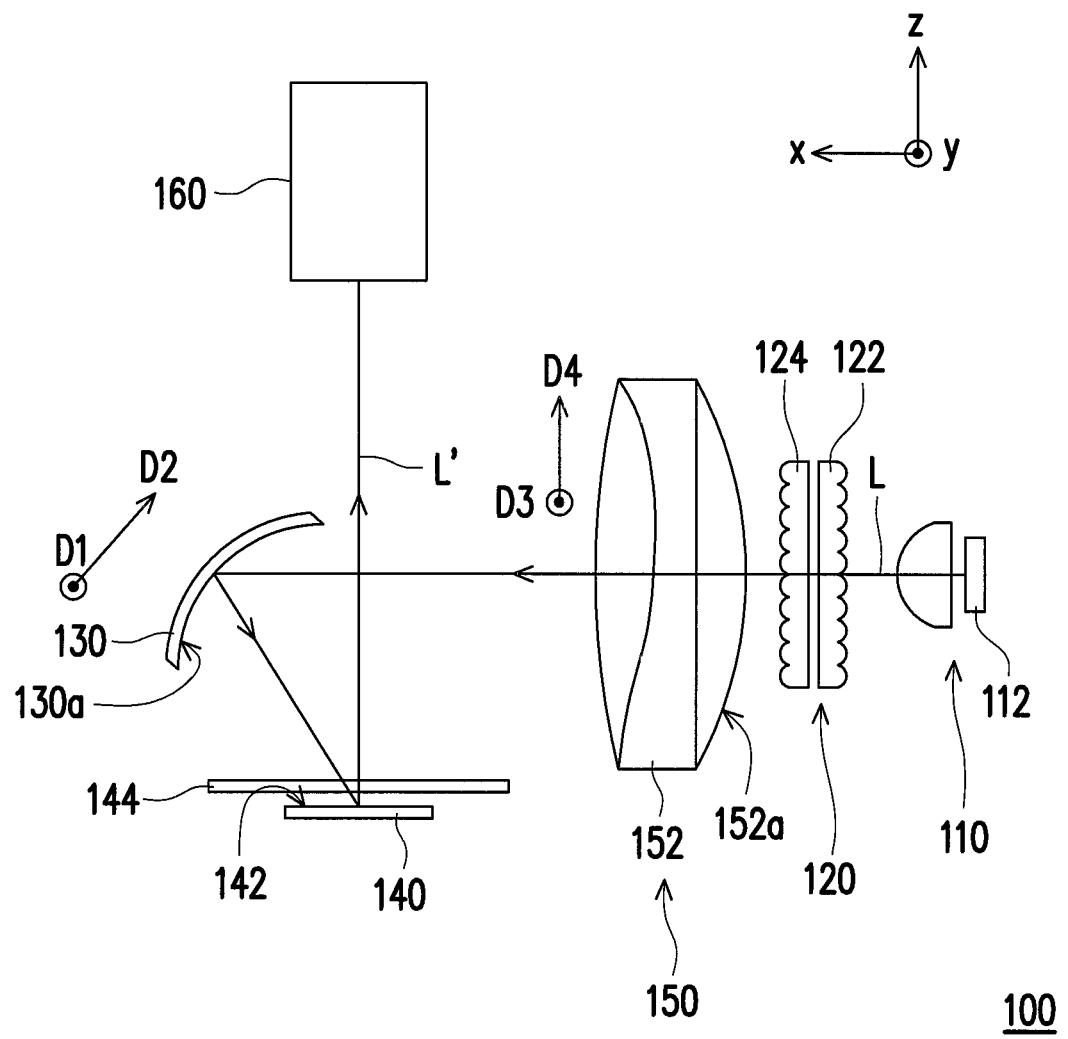
FIG. 1B is a top view of a projection apparatus according to another embodiment of the invention.

FIG. 1B is a top view of a projection apparatus according to another embodiment of the invention. The projection apparatus in FIG. 1B is approximately the same as the projection apparatus 100 in FIG. 1A except the field lens. In the embodiment, no field lens is placed in front of the light valve 140.

Figure 2A:
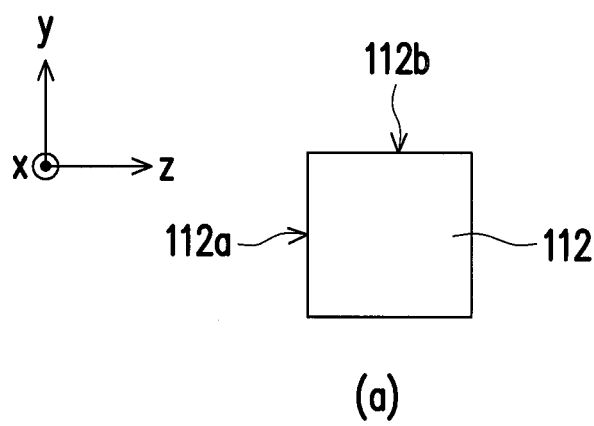
FIG. 2A illustrates a light source according to the first embodiment of the invention.
Figure 2A:
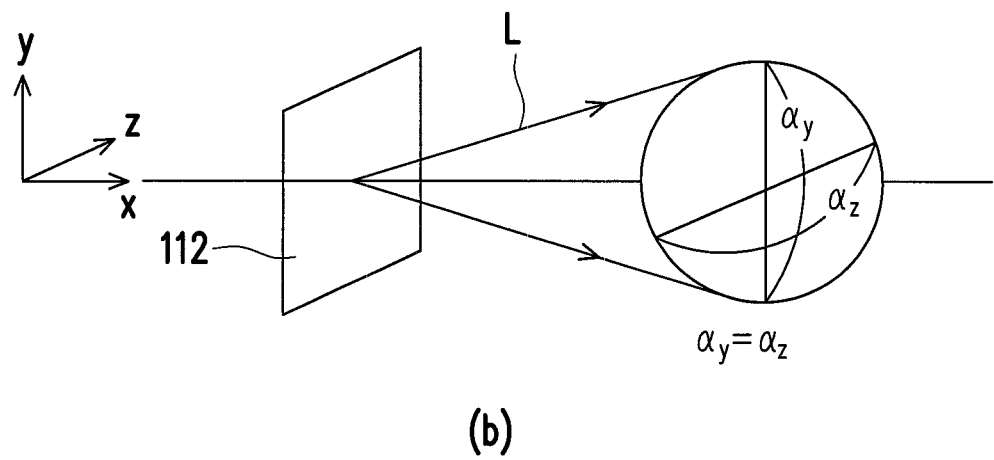

Part (a) of FIG. 2A is a front view of the rectangular LED chip 112, and part (b) of FIG. 2A illustrates the cone angle of the illumination beam L emitted from the rectangular LED chip 112. As shown in part (a) of FIG. 2A, the rectangular LED chip 112 in the embodiment is a square LED chip. As shown in part (b) of FIG. 2A, the cone angle of the illumination beam L emitted from the square LED chip 112 presents a symmetrical distribution. To be specific, the cone angle $\alpha_z$ of the illumination beam L emitted from the square LED chip 112 in the direction z is substantially equal to the cone angle $\alpha_y$ of the illumination beam L emitted from the square LED chip 112 in the direction y. However, the invention is not limited thereto, and in other embodiments, the rectangular LED chip 112 may also be in a rectangular shape and the cone angle $\alpha_z$ and the cone angle $\alpha_y$ of the illumination beam emitted from the rectangular LED chip 112 may also be substantially different.

Referring to FIG. 1A again, the light uniforming device 120 in the embodiment is disposed on the transmission path of the illumination beam L and between the light source 110 and the light valve 140. The light uniforming device 120 in the embodiment includes at least a pair of lens arrays 122 and 124. However, the invention is not limited thereto, and in other embodiments, the light uniforming device may also be a pair of lens array that are bonded together or an integrally formed lens array having two lens array surfaces or light integration rod.

Figure 2B:
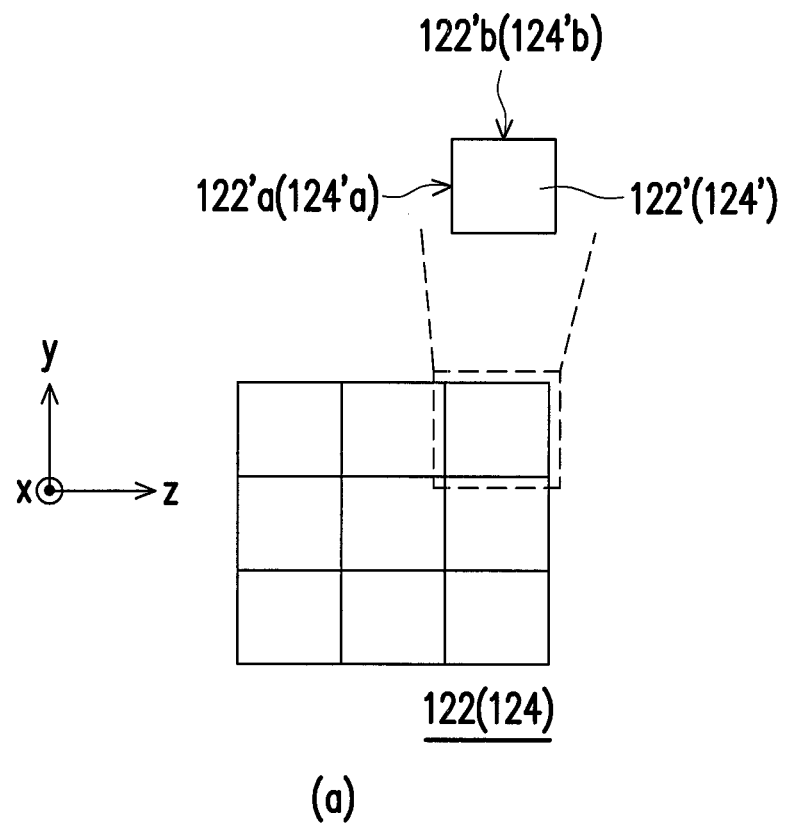
FIG. 2B illustrates a light uniforming device according to the first embodiment of the invention.
Figure 2B:
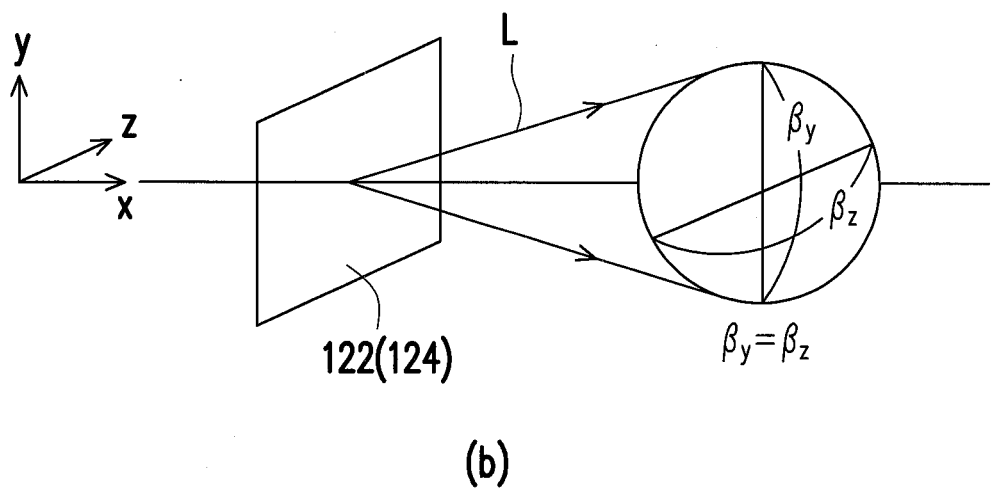

Part (a) of FIG. 2B is a front view of the lens array 122 or 124. Referring to both part (a) of FIG. 2A and part (a) of FIG. 2B, in the embodiment, the lens array 122 (and 124) has a plurality of rectangular lenses 122' (and 124') arranged as an array, wherein the ratio of the length of the short side 122'a (and 124'a) of each rectangular lens 122' (and 124') to the length of the long side 122'b (and 124'b) of the rectangular lens 122' (and 124') is adjusted according to the ratio of the length of the short side 112a of the rectangular LED chip 112 to the length of the long side 112b of the rectangular LED chip 112.

For example, the ratio of the length of the short side 112a of the rectangular LED chip 112 to the length of the long side 112b of the rectangular LED chip 112 is substantially equal to 1, and the ratio of the length of the short side 122'a (and 124'a) of each rectangular lens 122' (and 124') to the length of the long side 122'b (and 124'b) of the rectangular lens 122' (and 124') is also designed to be substantially equal to 1. Namely, in the embodiment, the rectangular LED chip 112 is a square LED chip, and the rectangular lenses 122' are also designed to be square lenses according to the shape of the rectangular LED chip 112. Accordingly, the lens array 122 (and 124) has the same valid range of the light collection angle in the directions y and z therefore can receive the illumination beam L (the cone angle thereof presents a symmetrical distribution) emitted by the square LED chip 112 more effectively compared to a conventional rectangular lens.

Part (b) of FIG. 2B illustrates the cone angle of the illumination beam L after it passes through the lens array 122 (and 124) according to an embodiment of the invention. The cone angle of the illumination beam L after it passes through the lens array 122 (and 124) still presents a symmetrical distribution. To be specific, after the illumination beam L passes through the lens array 122 (and 124), the cone angle $\beta_z$ thereof in the direction z and the cone angle $\beta_y$ thereof in the direction y are substantially the same.

In an embodiment of the invention, the ratio of the length of the short side 112a of the rectangular LED chip 112 to the length of the long side 112b of the rectangular LED chip 112 is substantially equal to the ratio of the length of the short side 122'a (and 124'a) of each rectangular lens 122' (and 124') to the length of the long side 122'b (and 124'b) of each rectangular lens 122' (and 124') (for example, ¾ or 9/16).

Referring to FIG. 1A again, the first curved-surface reflection device 130 in the embodiment is disposed on the transmission path of the illumination beam L and on the optical paths between the light source 110 and the light valve 140 for reflecting the illumination beam L to the light valve 140. To be specific, on the transmission path of the illumination beam L, the first curved-surface reflection device 130 is between the light uniforming device 120 and the light valve 140. It should be noted that the first curved-surface reflection device 130 has a reflecting surface 130a, wherein the curvature of the reflecting surface 130a along a direction D1 (defined as the direction emerging from the surface of the paper) is not equal to the curvature of the reflecting surface

130*a* along a direction D2. Additionally, in the embodiment, the direction D1 is substantially perpendicular to the direction D2, and the first curved-surface reflection device 130 is a concave mirror. However, the invention is not limited thereto, and in other embodiments, the first curved-surface reflection device 130 may also be a cylindrical mirror or a convex mirror.

Figure 2C:
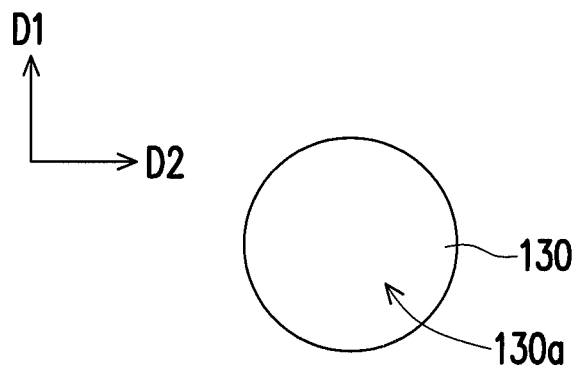
FIG. 2C illustrates a first curved-surface reflection device according to the first embodiment of the invention.
Figure 2C:
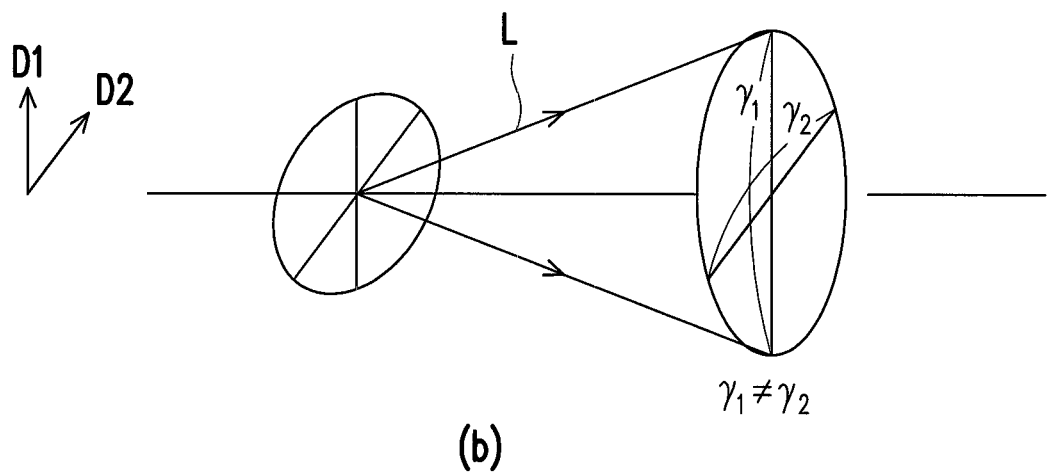

Part (a) of FIG. 2C is a front view of the first curved-surface reflection device 130 according to an embodiment of the invention. Part (b) of FIG. 2C illustrates the cone angle of the illumination beam L reflected by the first curved-surface reflection device 130 according to an embodiment of the invention. Referring to FIG. 1A, FIG. 1B, and parts (a) and (b) of FIG. 2C, because the curvature of the first curved-surface reflection device 130 along the direction D1 is not equal to the curvature thereof along the direction D2, the cone angle of the illumination beam L presents an asymmetrical distribution after the illumination beam L emitted from the light uniforming device 120 is reflected by the first curved-surface reflection device 130. To be specific, as shown in part (b) of FIG. 2C, the cone angle $\gamma_1$ of the illumination beam L along the direction D1 and the cone angle $\gamma_2$ of the illumination beam L along the direction D2 after the illumination beam L is reflected by the first curved-surface reflection device 130 are not equal to each other. Thus, the light spot formed by the illumination beam L can be shaped into a rectangular shape similar to that of an active surface 142 of the light valve 140, so that when the illumination beam L radiates on the light valve 140, the light spot overlaps the rectangular active surface 142. Thereby, the first curved-surface reflection device 130 can improve the light use efficiency of the projection apparatus 100 and increase the quantity of the illumination beam L reaching the light valve 140.

Referring to FIG. 1A again, the light valve 140 in the embodiment is disposed on the transmission path of the illumination beam L for converting the illumination beam L into an image beam L'. The light valve 140 has the active surface 142, and the active surface 142 substantially has a rectangular contour. In the embodiment, the light valve 140 may be a digital micro-minor device (DMD), a liquid-crystal-on-silicon (LCOS) panel, or a transmissive liquid crystal display panel. However, the invention is not limited thereto. In addition, a transparent protection cover 144 may be disposed in front of the light valve 140 for protecting the light valve 140.

Figure 2D:
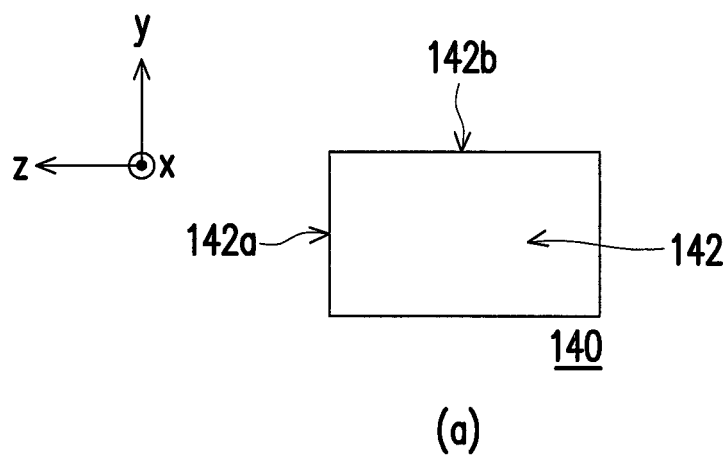
FIG. 2D illustrates a light valve according to the first embodiment of the invention.
Figure 2D:
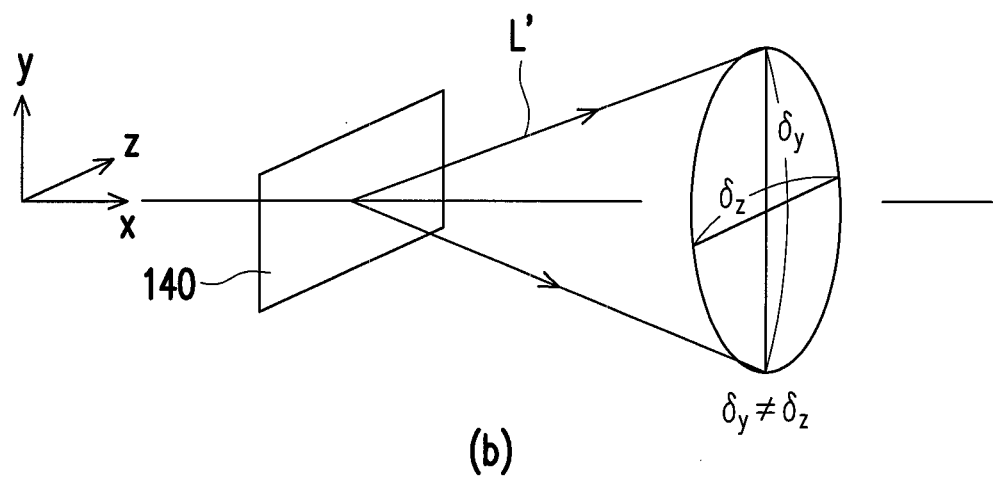

Part (a) of FIG. 2D is a front view of the light valve 140. Part (b) of FIG. 2D illustrates the cone angle of the image beam L' emitted from the light valve 140. Referring to part (a) of FIG. 2B and part (a) of FIG. 2D, in the embodiment, the ratio of the length of the short side 122'*a* (and 124'*a*) of each rectangular lens 122' (and 124') in the lens array 122 (and 124) to the length of the long side 122'*b* (and 124'*b*) of each rectangular lens 122' (and 124') is greater than the ratio of the length of the short side 142*a* of the active surface 142 of the light valve 140 to the length of the long side 142*b* of the active surface 142 of the light valve 140. In other words, the active surface 142 of the light valve 140 is in a rectangular shape that is longer and narrower than the shape of the cross section of the rectangular lens 122' along the plane yz. Namely, the cross section of the rectangular lens 122' (and 124') along the plane yz may be square, while the active surface 142 of the light valve 140 may be rectangular.

Referring to part (b) of FIG. 2D, the cone angle of the image beam L' emitted from the light valve 140 presents an asymmetrical distribution. To be specific, the cone angle $\delta_z$ of the image beam L' emitted from the light valve 140 in the direction z is substantially not equal to the cone angle $\delta_y$ thereof in the direction y. Thus, the projection apparatus in the embodiment can project an image having different length and width (for example, an image with an aspect ratio of 16:9 or 4:3) on an external screen.

The projection apparatus 100 in the embodiment may further include a lens module 150. The lens module 150 is disposed on the transmission path of the illumination beam L and on the optical paths between the light source 110 and the light valve 140. The diopter of the lens module 150 in a direction D3 is not equal to the diopter thereof in a direction D4. To be specific, the lens module 150 includes a lens 152. The lens 152 may be a biconic lens. The curvature of at least one surface 152*a* of the lens 152 in the direction D3 is not equal to the curvature thereof in the direction D4. The illumination beam L passes through the surface 152*a*. Herein the direction D3 is substantially perpendicular to the direction D4. In the embodiment, the lens module 150 also adjusts the light spot of the illumination beam L emitted from the light uniforming device 120 to make the shape of the light spot of the illumination beam L emitted from the first curved-surface reflection device 130 to be more similar to the rectangular shape of the active surface 142 of the light valve 140, so as to further improve the light use efficiency of the projection apparatus 100 in the embodiment.

Moreover, the projection apparatus 100 in the embodiment may further include a projection lens 160. The projection lens 160 is disposed on the transmission path of the image beam L'. The image beam L' can be transmitted to an external screen through the projection lens 160, so as to produce an image on the external screen to be viewed by users. Besides, the projection apparatus 100 in the embodiment may further include a field lens 170. The field lens 170 is disposed on the transmission path of the illumination beam L and on the optical paths between the light uniforming device 120 and the light valve 140, wherein the field lens 170 is disposed on the transmission path of the image beam L' and between the light valve 140 and the projection lens 160.

The disposition of various optical devices in a projection apparatus provided by the invention is not limited to that illustrated in FIG. 1 and may have many other variations. Besides, the projection apparatus in the invention may further include other optical devices not shown in FIG. 1 such that the optical devices in the projection apparatus of the invention may be disposed in a more flexible way in order to meet different actual design requirements. Several disposition examples of optical devices in the projection apparatus will be described hereinafter. The projection apparatuses described below have functions and advantages similar to those of the projection apparatus 100 in the first embodiment, and these functions and advantages will not be described again.

Second Embodiment

Figure 3:
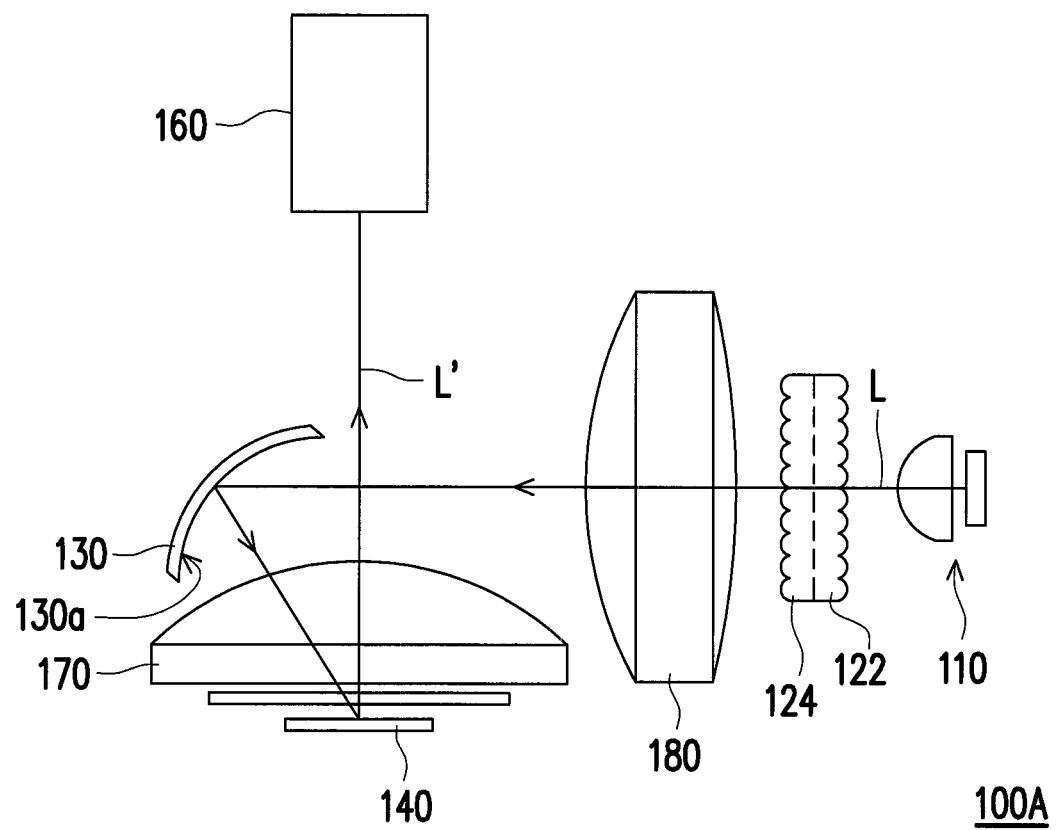
FIG. 3 is a top view of a projection apparatus according to a second embodiment of the invention.

FIG. 3 is a top view of a projection apparatus 100A according to the second embodiment of the invention. Referring to FIG. 3, the projection apparatus 100A in the embodiment is similar to the projection apparatus 100 in the first embodiment, and the difference between the two is that the projection apparatus 100A in the embodiment includes a relay lens 180. The relay lens 180 allows the illumination beam L to be led to the first curved-surface reflection device 130. Besides, the lens arrays 122 and 124 in the embodiment can be integrally formed.

Third Embodiment

Figure 4:
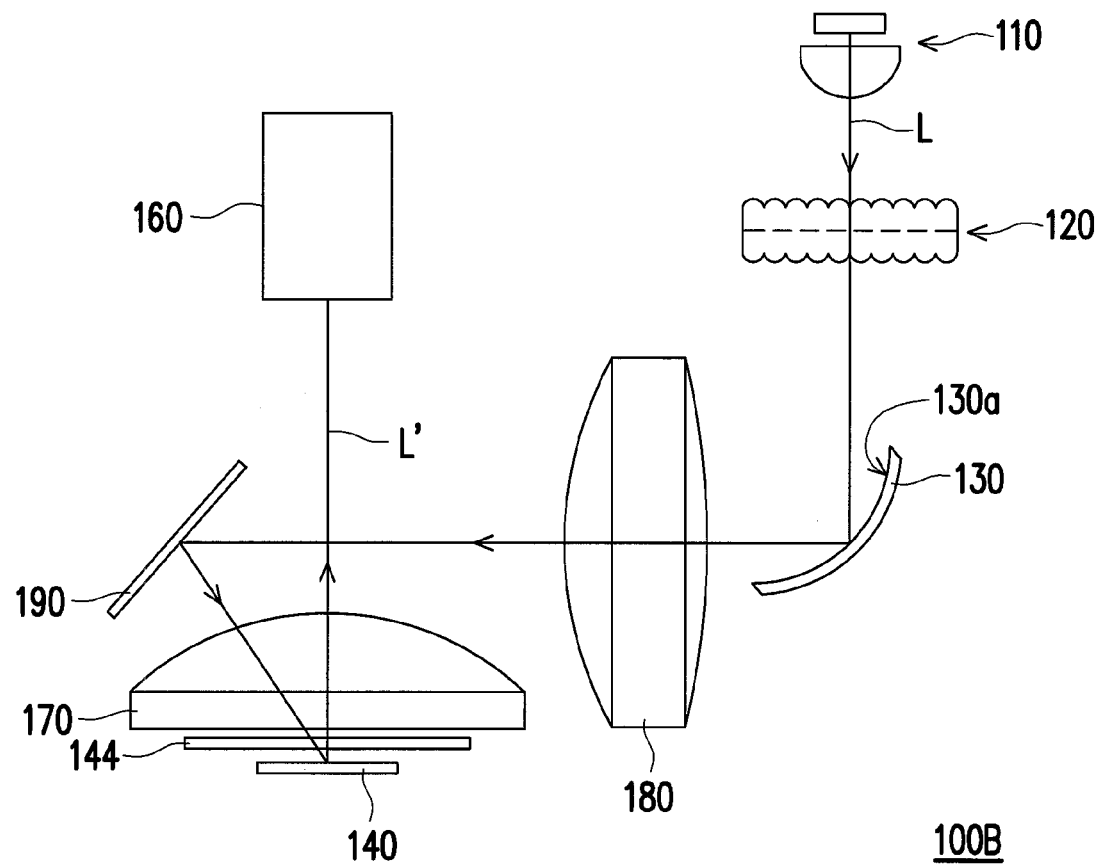
FIG. 4 is a top view of a projection apparatus according to a third embodiment of the invention.

FIG. 4 is a top view of a projection apparatus 100B according to the third embodiment of the invention. Referring to FIG. 4, the projection apparatus 100B in the embodiment is similar to the projection apparatus 100A in the second embodiment, and the difference between the two is that the projection apparatus 100B in the embodiment further includes a reflection device 190, wherein the reflection device 190 may be a mirror. In addition, in the projection apparatus 100B of the embodiment, the first curved-surface reflection device 130 is disposed at a different position as that in the projection apparatus 100A of the second embodiment.

To be specific, in the embodiment, the first curved-surface reflection device 130 is on the optical paths between the light uniforming device 120 and the relay lens 180. The reflection device 190 is on the optical paths between the relay lens 180 and the light valve 140, wherein the reflection device 190 reflects the illumination beam L emitted from the first curved-surface reflection device 130 to the light valve 140. In other words, the reflection device 190 in the embodiment can reflect the illumination beam L which is reflected by the first curved-surface reflection device 130 and passes through the relay lens 180 to the light valve 140, so that the illumination beam L can be used by the projection apparatus 100B. Additionally, in another embodiment, the lens 152 as shown in FIG. 1 may be added or used to replace the relay lens 180 to make the shape of the light spot formed by the illumination beam L emitted from the first curved-surface reflection device 130 to be more similar to the rectangular shape of the active surface 142 of the light valve 140, so that the light use efficiency of the projection apparatus 100B in the embodiment can be further improved.

Fourth Embodiment

Figure 5:
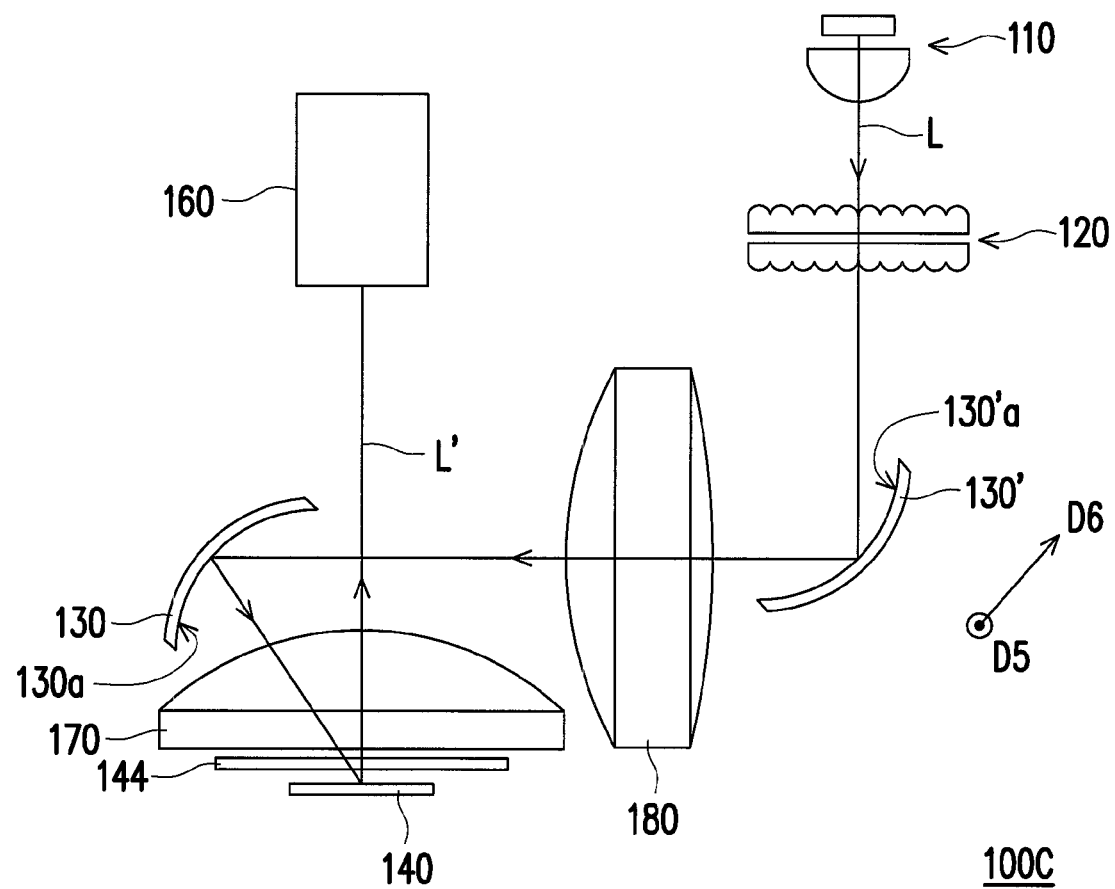
FIG. 5 is a top view of a projection apparatus according to a fourth embodiment of the invention.

FIG. 5 is a top view of a projection apparatus 100C according to the fourth embodiment of the invention. Referring to FIG. 5, the projection apparatus 100C in the embodiment is similar to the projection apparatus 100A in the second embodiment, and the difference between the two is that the projection apparatus 100C in the embodiment further includes a second curved-surface reflection device 130'.

To be specific, the second curved-surface reflection device 130' is on the optical paths between the light uniforming device 120 and the first curved-surface reflection device 130, and the relay lens 180 is between the first curved-surface reflection device 130 and the second curved-surface reflection device 130', wherein the curvature of the second curved-surface reflection device 130' in a direction D5 is not equal to the curvature of the second curved-surface reflection device 130' in a direction D6, and the direction D5 is substantially perpendicular to the direction D6. In the embodiment, the concave surface 130'a of the second curved-surface reflection device 130' faces the concave surface 130a of the first curved-surface reflection device 130. After the illumination beam L passes through the light uniforming device 120, it is reflected by the second curved-surface reflection device 130' and passes through the relay lens 180. After that, the illumination beam L is reflected by the first curved-surface reflection device 130 to the light valve 140. Besides, because the curvature of the second curved-surface reflection device 130' in the direction D5 is not equal to the curvature of the second curved-surface reflection device 130' in the direction D6, the second curved-surface reflection device 130' can also adjust the shape of the light spot of the illumination beam L to make the shape of the light spot of the illumination beam L to be more similar to the rectangular shape of the active surface 142 of the light valve 140, so as to further improve the light use efficiency of the projection apparatus 100C.

Fifth Embodiment

Figure 6:
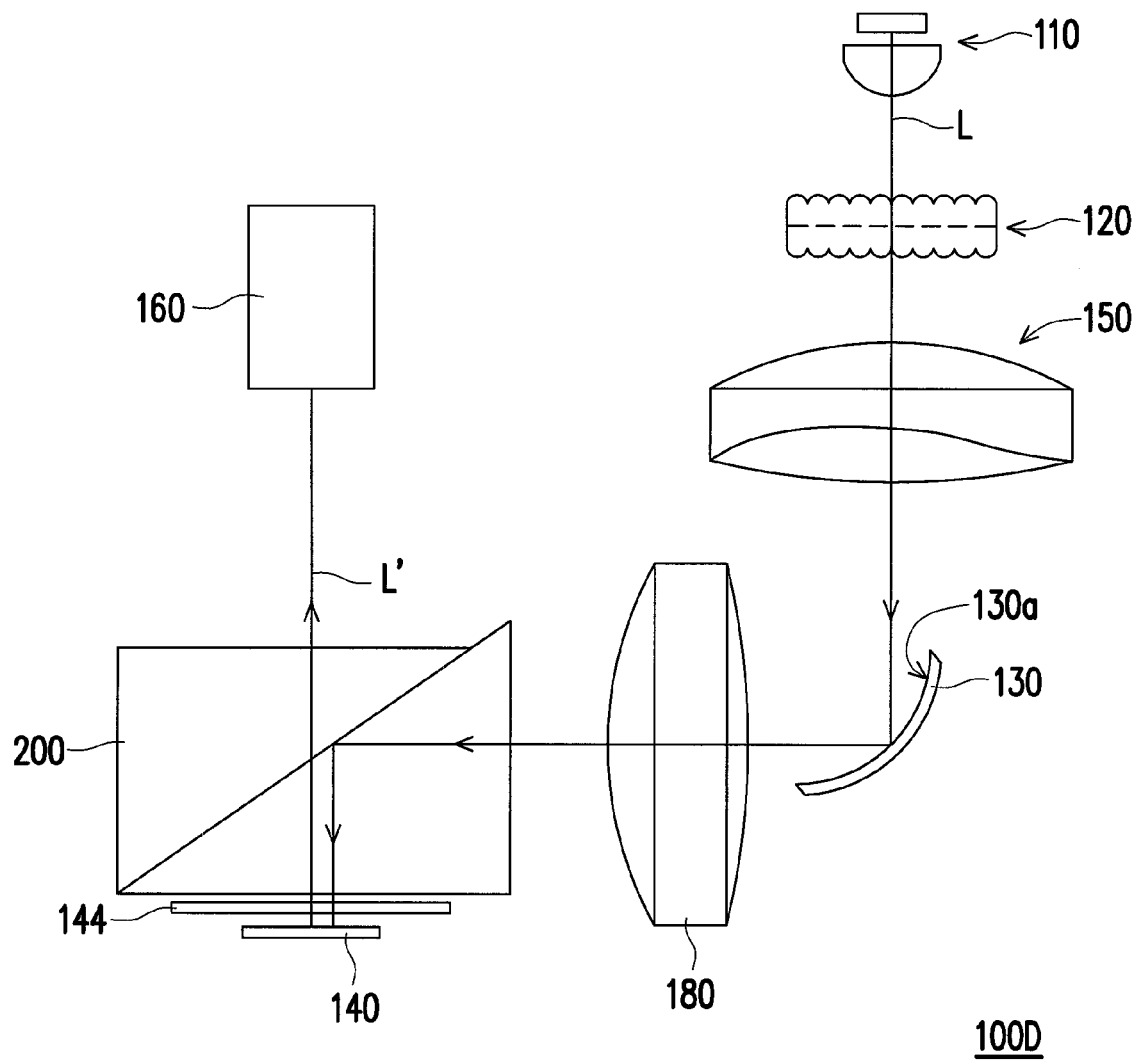
FIG. 6 is a top view of a projection apparatus according to a fifth embodiment of the invention.

FIG. 6 is a top view of a projection apparatus 100D according to the fifth embodiment of the invention. Referring to FIG. 6, the projection apparatus 100D in the embodiment is similar to the projection apparatus 100 in the first embodiment, and the difference between the two is that the projection apparatus 100B in the embodiment includes a relay lens 180 and a total internal reflection (TIR) prism 200. Besides, the light uniforming device 120 in the embodiment is integrally formed.

In the embodiment, the lens module 150 is between the light uniforming device 120 and the first curved-surface reflection device 130. The first curved-surface reflection device 130 in the embodiment is on the optical paths between the light uniforming device 120 and the TIR prism 200. The relay lens 180 is disposed on the transmission path of the illumination beam L and on the optical paths between the first curved-surface reflection device 130 and the light valve 140. The TIR prism 200 is disposed on the transmission path of the illumination beam L and on the optical paths between the relay lens 180 and the light valve 140, wherein the TIR prism 200 is disposed on the transmission path of the image beam L' and between the light valve 140 and the projection lens 160.

In the embodiment, the TIR prism 200 reflects the illumination beam L to the light valve 140 and allows the image beam L' to pass through, so that the image beam L' can be led to the projection lens 160. However, the disposition of the projection apparatus in the invention is not limited to that of the projection apparatus 100D illustrated in FIG. 6, and in other embodiments, the positions of the relay lens 180 and the lens module 150 can be exchanged. In addition, the lens module 150 or the relay lens 180 may be selectively disposed in the projection apparatus in another embodiment.

Sixth Embodiment

Figure 7:
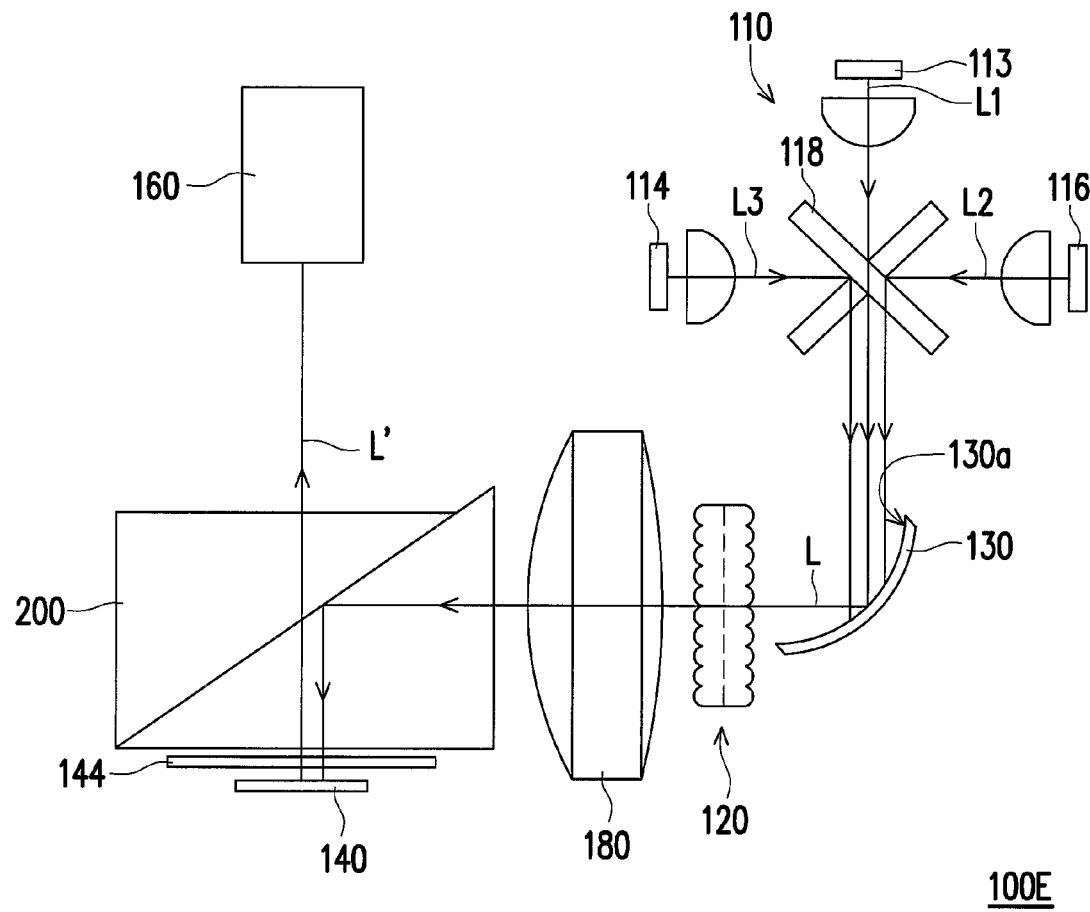
FIG. 7 is a top view of a projection apparatus according to a sixth embodiment of the invention.

FIG. 7 is a top view of a projection apparatus 100E according to the sixth embodiment of the invention. Referring to FIG. 7, the projection apparatus 100E in the embodiment is similar to the projection apparatus 100D in the fifth embodiment, and the difference between the two is that the light source 110 in the projection apparatus 100E of the embodiment is of a different type as that of the light source 110 in the projection apparatus 100D. In addition, in the projection apparatus 100E of the embodiment, the disposition of the light uniforming device 120 is different from that in the fifth embodiment.

To be specific, the light source 110 in the embodiment emits a first color beam L1, a second color beam L2, and a third color beam L3. The light source 110 in the embodiment includes three LED chips 113, 114, and 116, wherein the LED chips 113, 114, and 116 respectively emit red, green, and blue lights. The light source 110 in the embodiment further includes a light combination device 118. The light combination device 118 is disposed on the transmission paths of the first color beam L1, the second color beam L2, and the third color beam L3 for combining the first color beam L1, the second color beam L2, and the third color beam L3. In the embodiments described above and following embodiments, when the three LED chips 113, 114, and 116 are turned on at the same time, the first color beam L1, the second color beam L2, and the third color beam L3 are combined into a white light beam. In addition, the three LED chips 113, 114, and 116 can alternatively and quickly flicker so that the first color beam L1, the second color beam L2, and the third color beam L3 can alternatively enter the light combination device 118. In other words, the first color beam L1, the second color beam L2, and the third color beam L3 are combined into the illumination beam L after they pass through the light combination device 118.

Additionally, in the embodiment, the first curved-surface reflection device 130 is disposed on the transmission path of the illumination beam L and on the optical paths between the light source 110 and the light uniforming device 120. The light uniforming device 120 is disposed on the transmission path of the illumination beam L and on the optical paths between the first curved-surface reflection device 130 and the light valve 140. Because the illumination beam L passes through the first curved-surface reflection device 130 and then the light uniforming device 120, when the illumination beam L enters the light uniforming device 120, the light spot has been shaped by the first curved-surface reflection device 130. Thus, the ratio of the length of the short side 122'a (and 124'a) of the rectangular lens 122' (and 124') of the light uniforming device 120 to the length of the long side 122'b (and 124'b) of the rectangular lens 122' (and 124') can be adjusted according to the aspect ratio of the shaped light spot. Moreover, the first curved-surface reflection device 130 can shape the light spot so that the aspect ratio of the light spot is substantially equal to the ratio of the length of the short side 142a of the active surface 142 of the light valve 140 to the length of the long side 142b of the active surface 142 of the light valve 140. In this case, the ratio of the length of the short side 122'a (and 124'a) of the rectangular lens 122' (and 124') of the light uniforming device 120 to the length of the long side 122'b (and 124'b) of the rectangular lens 122' (and 124') can also be designed to be equal to the ratio of the length of the short side 142a of the active surface 142 of the light valve 140 to the length of the long side 142b of the active surface 142 of the light valve 140.

Seventh Embodiment

Figure 8:
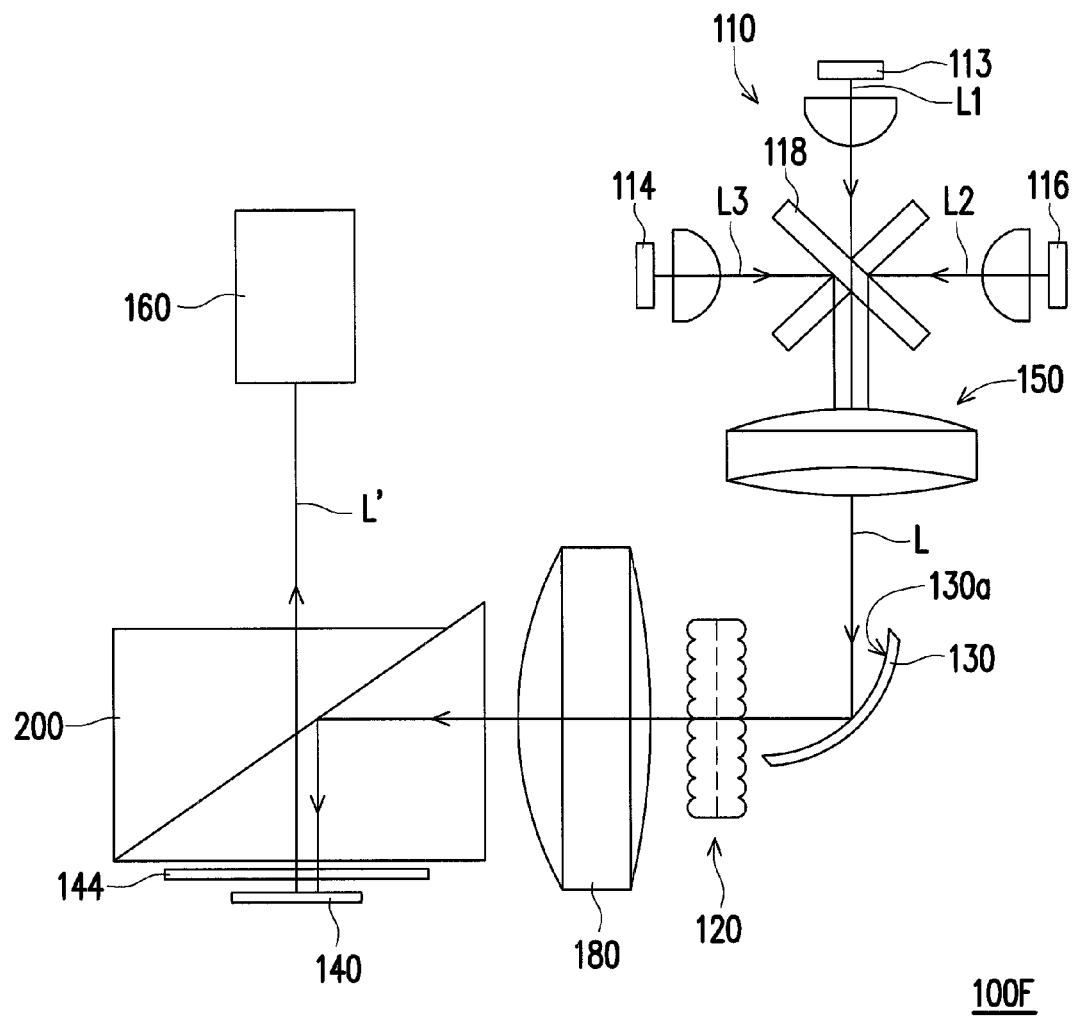
FIG. 8 is a top view of a projection apparatus according to a seventh embodiment of the invention.

FIG. 8 is a top view of a projection apparatus 100F according to the seventh embodiment of the invention. Referring to FIG. 7, the projection apparatus 100F in the embodiment is similar to the projection apparatus 100E in the sixth embodiment. However, the projection apparatus 100F in the embodiment selectively includes a lens module 150.

As described above, an embodiment of the invention has at least one of the following advantages or functions. In an embodiment of the invention, the first curved-surface reflection device shapes the illumination beam into a rectangular shape similar to that of the active surface of the light valve, so as to increase the quantity of the illumination beam reaching the light valve. Accordingly, the shape of the light uniforming device is not limited to the shape of the active surface of the light valve but can be adjusted according to the shape of the light spot formed by the illumination beam emitted from the light source or the shape of the LED chips. Thus, the illumination beam emitted by the light source can be effectively received by the light uniforming device. Thereby, the projection apparatus in an embodiment of the invention offers a high light use efficiency. Directions (for example, the first direction, the second direction, and etc) and the first curved-surface reflection device, the second curved-surface reflection device, and other components mentioned in the disclosure are only used for indicating the names of the components but not intended to limit the number thereof.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
   a light source, for providing an illumination beam;
   a light valve, disposed on a transmission path of the illumination beam, for converting the illumination beam into an image beam, wherein the light valve has an active surface, and the active surface substantially has a rectangular contour;
   a light uniforming device, disposed on the transmission path of the illumination beam and between the light source and the light valve;
   a first curved-surface reflection device, disposed on the transmission path of the illumination beam and between the light source and the light valve, for reflecting the illumination beam to the light valve, wherein a curvature of the first curved-surface reflection device along a first direction is not equal to a curvature of the first curved-surface reflection device along a second direction; and
   a lens module disposed on the transmission path of the illumination beam and between the light source and the light valve, wherein a diopter of the lens module along a third direction is not equal to a diopter of the lens module along a fourth direction.

2. The projection apparatus according to claim 1, wherein the lens module comprises a lens, a curvature of at least one surface of the lens along the third direction is not equal to a curvature of the surface of the lens along the fourth direction, the illumination beam passes through the surface, and the third direction is substantially perpendicular to the fourth direction.

3. The projection apparatus according to claim 1, wherein the lens module is between the light source and the light uniforming device.

4. The projection apparatus according to claim 1, wherein the lens module is between the light uniforming device and the first curved-surface reflection device.

5. The projection apparatus according to claim 1, wherein the lens module is between the first curved-surface reflection device and the light valve.

6. The projection apparatus according to claim 1, wherein the first direction is substantially perpendicular to the second direction.

7. The projection apparatus according to claim 1, wherein the light uniforming device comprises at least one lens array.

8. The projection apparatus according to claim 7, wherein the lens array has a plurality of rectangular lenses arranged as an array, and a ratio of a length of a short side of each of the rectangular lenses to a length of a long side of each of the rectangular lenses is greater than a ratio of a length of a short side of the active surface of the light valve to a length of a long side of the active surface of the light valve.

9. The projection apparatus according to claim 8, wherein the ratio of the length of the short side of each of the rectangular lenses to the length of the long side of each of the rectangular lenses is substantially equal to 1.

10. The projection apparatus according to claim 7, wherein the lens array has a plurality of rectangular lenses arranged as an array, the light source comprises a rectangular light emitting diode chip, and a ratio of a length of a short side of each of the rectangular lenses to a length of a long side of each of the rectangular lens is substantially equal to a ratio of a length of a short side of the rectangular light emitting diode chip to a length of a long side of the rectangular light emitting diode chip.

11. The projection apparatus according to claim 10, wherein the ratio of the length of the short side of the rectangular light emitting diode chip to the length of the long side of the rectangular light emitting diode chip is substantially equal to 1.

12. The projection apparatus according to claim 1 further comprising a second curved-surface reflection device between the light uniforming device and the first curved-surface reflection device, wherein a curvature of the second curved-surface reflection device along a third direction is not equal to a curvature of the second curved-surface reflection device along a fourth direction, and the third direction is substantially perpendicular to the fourth direction.

13. The projection apparatus according to claim 1 further comprising a reflection device between the first curved-surface reflection device and the light valve, wherein the reflection device reflects the illumination beam reflected by the first curved-surface reflection device to the light valve.

14. The projection apparatus according to claim 1 further comprising a projection lens disposed on a transmission path of the image beam.

15. The projection apparatus according to claim 14 further comprising a total internal reflection prism disposed on the transmission path of the illumination beam and between the light source and the light valve, wherein the total internal reflection prism is disposed on the transmission path of the image beam and between the light valve and the projection lens.

16. The projection apparatus according to claim 15, wherein the first curved-surface reflection device is between the light uniforming device and the total internal reflection prism.

17. The projection apparatus according to claim 15, wherein the first curved-surface reflection device is between the light source and the light uniforming device.

18. The projection apparatus according to claim 14 further comprising a field lens disposed on the transmission path of the illumination beam and between the light uniforming device and the light valve, wherein the field lens is disposed on the transmission path of the image beam and between the light valve and the projection lens.

19. The projection apparatus according to claim 1, wherein the light source is configured to emit a first color beam, a second color beam, and a third color beam.

20. The projection apparatus according to claim 19, wherein the light source further comprises a light combination device disposed on transmission paths of the first color beam, the second color beam, and the third color beam for combining the transmission paths of the first color beam, the second color beam, and the third color beam.

21. The projection apparatus according to claim 1, wherein the light uniforming device is a light integration rod.

22. The projection apparatus according to claim 1, wherein the light source comprises a light emitting diode or a high pressure mercury lamp.

23. The projection apparatus according to claim 1, wherein the first curved-surface reflection device is a concave mirror or a cylindrical mirror.

24. A projection apparatus, comprising:
a light source, for providing an illumination beam;
a light valve, disposed on a transmission path of the illumination beam, for converting the illumination beam into an image beam, wherein the light valve has an active surface, and the active surface substantially has a rectangular contour;
a light uniforming device, disposed on the transmission path of the illumination beam and between the light source and the light valve;
a first curved-surface reflection device, disposed on the transmission path of the illumination beam and between the light source and the light valve, for reflecting the illumination beam to the light valve, wherein a curvature of the first curved-surface reflection device along a first direction is not equal to a curvature of the first curved-surface reflection device along a second direction;
a projection lens disposed on a transmission path of the image beam; and
a total internal reflection prism disposed on the transmission path of the illumination beam and between the light source and the light valve, wherein the total internal reflection prism is disposed on the transmission path of the image beam and between the light valve and the projection lens, and the first curved-surface reflection device is between the light uniforming device and the total internal reflection prism.

* * * * *